United States Patent [19]

Seeley

[11] Patent Number: 5,042,295

[45] Date of Patent: Aug. 27, 1991

[54] METHOD FOR DETERMINING REMAINING USEFUL LIFE OF TURBINE COMPONENTS

[75] Inventor: Robert E. Seeley, Broadalbin, N.Y.

[73] Assignee: General Electric Company, Schenectady, N.Y.

[21] Appl. No.: 528,891

[22] Filed: May 29, 1990

Related U.S. Application Data

[63] Continuation of Ser. No. 747,514, Jun. 21, 1985, abandoned.

[51] Int. Cl.[5] .......... G01M 15/00

[52] U.S. Cl. .......... 73/117.3; 364/431.02

[58] Field of Search .......... 73/117.3, 116; 364/431.02; 415/118

[56] References Cited

U.S. PATENT DOCUMENTS

| | | | |
|---|---|---|---|
| 3,527,086 | 9/1970 | Evans et al. | 73/116 |
| 3,584,507 | 6/1971 | Hohenberg | 73/116 |

FOREIGN PATENT DOCUMENTS

| | | |
|---|---|---|
| 2198190 | 3/1974 | France . |
| 2513412 | 3/1983 | France . |
| 57-29947 | 6/1982 | Japan . |
| 58-92952 | 8/1983 | Japan . |
| 461842 | 10/1968 | Switzerland . |

OTHER PUBLICATIONS

"Inspection and Life Evaluation of General Electric Turbine Rotors", Schwant and Timo, Oct. 3, 1984, ASME.

"Life Assessment of General Electric Large Steam Turbine Robots", Schwant and Timo, Sep. 12-14, 1984, EPRI Conference.

*Transactions of the ASME*, "A Time-Temperature Relationship for Rupture and Creep Stresses", Larson et al., Paper No. 51-A-36, Jul., 1952.

*Primary Examiner*—Jerry W. Myracle

*Attorney, Agent, or Firm*—Nixon & Vanderhye

[57] ABSTRACT

A method for determining the portion of life expended for a turbomachine component during a predetermined interval uses the rate at which creep strain accumulates to provide an indication of the portion of life expended.

11 Claims, 5 Drawing Sheets

METHOD FOR DETERMINING REMAINING USEFUL LIFE OF TURBINE COMPONENTS

This is a continuation of application Ser. No. 06/747,514, filed June 21, 1985, now abandoned.

BACKGROUND OF THE INVENTION

The present invention relates to a method for determining the remaining useful life, or life expended, of turbine components and, more particularly, to determining the remaining useful life of turbine components which generally operate at relatively high temperature and are thus employed in an environment wherein creep of materials constituting the turbine components becomes a major factor in determining remaining useful life of the components.

Current estimates of electrical energy production over the next twenty years show a critical dependence on steam power plants and associated turbines with over thirty years of service. Traditionally, utility plants and associated turbines of this age would be retired and replaced with new units. However, in the current environment of depressed load demand and high cost of new construction, utilities are increasingly relying on life extension programs for these older plants in order to meet their expected future power delivery requirements. Practical and business considerations require that these life extension programs be implemented while maintaining traditional levels of availability, performance and reliability. Achievement of an optimum balance between investment capital and required return, necessitates evaluation of existing condition and probable future performance of critical turbine components, as well as realistic assessment of risks associated with various life extension options.

Evaluating present condition and determining probable future performance of turbine components, especially for those components that operate in the creep regime of materials constituting the components, present a challenge because of the complexity of turbine components, the variety of in service operating conditions experienced by the components and the inherent limitations of prevailing remaining useful life, or life expended, estimation methods. Components which operate at high temperatures (i.e. greater than about 900° F.), where a combination of creep and thermal fatigue of the material constituting the components is of prime concern, demand special consideration in order to achieve an acceptable remaining useful life estimation.

A variety of techniques are currently used for assessing remaining useful life of power plant components. These techniques can be generalized into two broad categories: destructive and/or non-destructive testing of the actual component, and analytical estimation by use of material behavior and component operating history.

Prior techniques using destructive or non-destructive examinations have been found to have limitations when applied to major turbine components. It is often difficult to obtain material for destructive testing from critical areas of these components and to gain suitable access to many critical regions of the turbine for non-destructive testing. In addition, while some prior non-destructive techniques may provide estimates of remaining useful life of a component that is subject to pure creep loading, normal operation of many turbine components subject them to combined creep and fatigue damage, the fatigue being quite significant in determining life expended, or used up, in the component. Creep, which is a function of the time interval during which stress is applied, is inelastic, or unrecoverable (i.e. unable to return to its original shape and state), deformation of a material. Fatigue, which is not time but stress cycle dependent, is a form of plastic strain that may ultimately cause a component to rupture. Prior techniques have not been able to adequately evaluate the magnitude of damage experienced from a combination of creep and fatigue. Another technique which has been used, but which has not provided adequate results, employs creep void density as an indication of expended creep life. Thus, these prior techniques do not generally yield results having the desired degree of accuracy on which to base recommendations so as to aid the decision making process for evaluating and comparing potential turbine extention strategies.

Analytical estimation of expended life (which then may be subtracted from estimated total life to yield remaining useful life) generally utilizes sophisticated material behavior representations, damage assessment rules, and actual (or idealized) past and future operating conditions. The accuracy of any particular analytical approach depends on the ability of the method to deal with uncertainties associated with actual operating components.

For example, in U.S. Pat. No. 4,046,002—Murphy et al, assigned to the present assignee, the method for determining rotor life expended is based on using low cycle fatigue damage, which is stress cycle dependent, and not creep rupture damage, which is time dependent. The stress range for each cycle is compared with a calculated stress range curve for the turbomachine part to determine the amount of life of the turbomachine part expended as a result of the cycle. The time interval between local stress peaks used to determine a stress cycle is not considered.

In U.S. Pat. No. 3,950,985—Buchwald et al, a method based on Miner's hypothesis of linear accumulation of damage is used. Miner's hypothesis may be expressed by equation (a):

$$\int_0^t dt/t(\sigma,\theta) = 1 \qquad (a)$$

wherein $t(\sigma,\theta)$ is the time to rupture for a stress $\sigma$ and temperature $\theta$. That is, Miner's hypothesis states that failure occurs when the integral on the left of equation (a) equals one. According to U.S. Pat. No. 3,950,985, the value of $t(\sigma,\theta)$ of equation (a) is determined from the graph of FIG. 1. Thus, this is a stress based method which does not consider the amount of creep strain accumulated.

Accordingly, it is an object of the present invention to provide a method for accurately determining remaining useful life, or life expended, of turbine components.

Another object of the present invention is to provide a method for accurately determining remaining useful life, or life expended, of turbine components while including the effects of temperature stress, creep strain accumulation, and rate of creep strain accumulation.

SUMMARY OF THE INVENTION

Nearly every turbine component operating at a high temperature, i.e. greater than about 900° F., experiences a change in the state of stress due to creep, even if the operating conditions (e.g. temperature, applied force)

remain constant. That is, a non-uniform stress distribution in a component results in non-uniform creep, wherein the highest stress region creeps the most, thereby causing a redistribution of stress within the component. In addition, any conversion of elastic strain to inelastic strain, such as may be brought about by creep, will result in a reduction in stress. Examples include relaxation of high local stresses in areas of stress concentrations, e.g. stresses in thread root of a bolt, and relaxation of displacement controlled stresses, e.g. thermal stresses and nominal axial stress in a bolt. Since these stresses are changing with time, it is difficult to accurately determine the life of the component from conventional constant load rupture data, i.e. stress versus time to rupture.

Methods for calculating accumulation of creep strain, as well as for comparing accumulated strain to strain capability of a material, in order to determine a failure criterion, have been used. However, in accordance with the present invention, it is the rate of creep strain accumulation which is used to assess the amount of damage done to a component having operated at a predetermined temperature and thus at a predetermined creep strain rate for a predetermined interval of time.

In accordance with the present invention, a method for determining the life expended for a turbomachine component comprises determining a creep strain versus time curve for operation of the turbomachine component, determining a corresponding rate of change in creep strain for a predetermined interval of time, determining a corresponding time to rupture for the rate of change in creep strain and dividing the predetermined interval of time by the time to rupture to generate a damage value, the damage value indicative of the portion of overall component life expended in operation during the predetermined interval of time. The rate of change and time to rupture from a plurality of predetermined intervals of time may be used to generate a corresponding plurality of damage values which may then be accumulated to determine overall damage to the component during operation.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
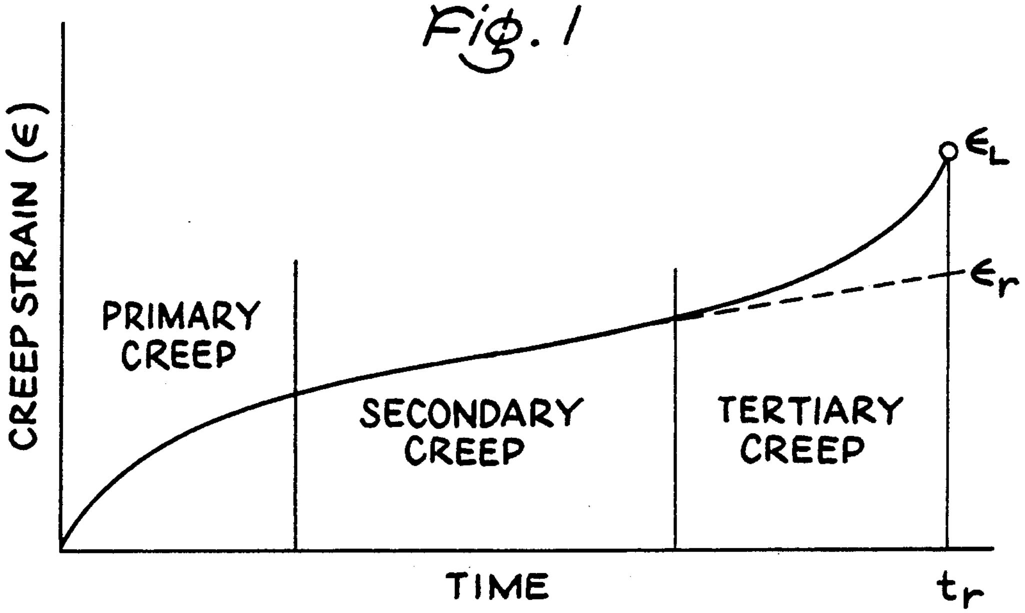
FIG. 1 is a graph of a typical constant load creep curve that is developed from measured data (solid) for a test specimen and extrapolated (dashed) for a turbine component at a predetermined temperature.

Referring to FIG. 1, a typical graph of creep strain versus time for a test specimen under constant load is shown. The solid curve represents measurements of creep strain in the test specimen through three stages of creep, i.e. primary, secondary and tertiary, and it terminates at the time to failure $t_r$, i.e. rupture, and the elongation at failure $\epsilon_L$. In accordance with the present invention, the solid curve in the primary and secondary creep regions is closely approximated by equation (1).

$$\dot{\epsilon}=Ae^{B\sigma}(1+C\epsilon^{F}) \qquad (1)$$

wherein, $\epsilon$=creep strain, $\sigma$=stress, and

Figure 2:
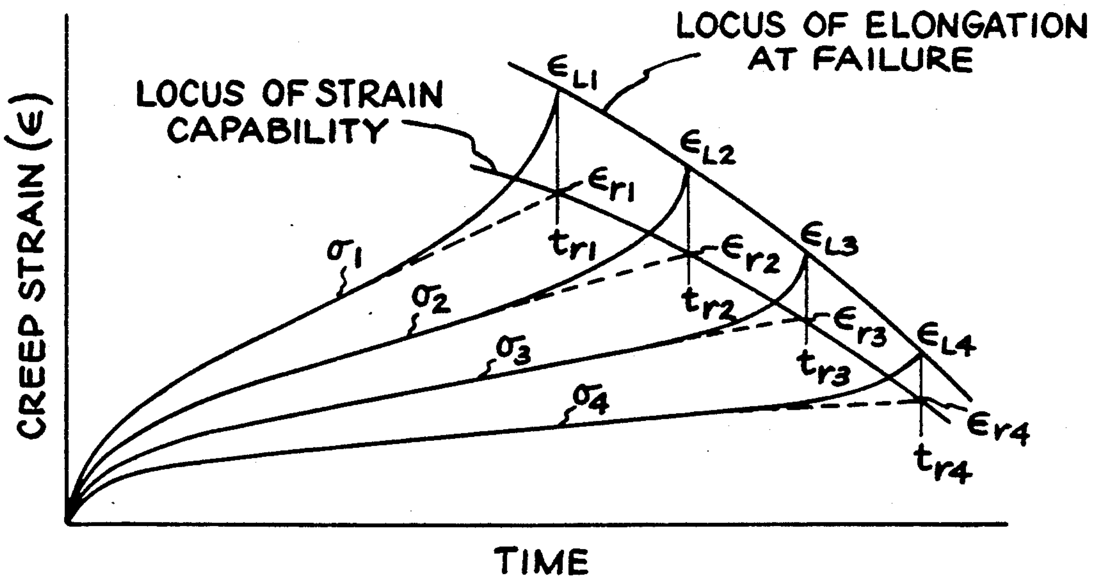
FIG. 2 is a graph of a series of constant load creep curves that are developed from measured data (solid) for a test specimen and extrapolated (dashed) for a turbine component for a plurality of applied predetermined load conditions at a predetermined temperature.

A,B,C and F=material constants which can be readily derived from a series of data such as represented by the curves of FIG. 2.

Equation (1) is composed of two parts. The first part, $Ae^{B\sigma}$, is a representation of secondary creep rate the second part, $(1+C\epsilon^{F})$, is a modifier that is predeterminately selected to model the creep rate during primary creep. No attempt has been made to model tertiary creep, which is characteristic of small laboratory specimens that neck down (i.e. decrease in cross section), thereby causing an increased creep rate. Continuation and extrapolation of secondary creep, as shown by the dashed line of FIG. 1, is believed by applicant to better represent accumulation of creep strain for actual turbine components, since the components generally do not enter the tertiary creep region, and even if they do enter that region, it is generally only for a small fraction of total component life. To be consistent with this model, strain capability $\epsilon_r$ is defined as the creep strain obtained by extrapolating secondary creep to time to rupture $t_r$, which may be determined from a test specimen.

Referring to FIG. 2, the results from a plurality of constant load (i.e. constant applied force) rupture tests for test specimens at a predetermined temperature are shown. Curves $\sigma_1$, $\sigma_2$, $\sigma_3$ and $\sigma_4$ represent the results for respective predetermined decreasing constant loads. It is noted that respective strain capability $\epsilon_{r1}$, $\epsilon_{r2}$, $\epsilon_{r3}$ and $\epsilon_{r4}$ decrease with a corresponding increase in respective rupture time $t_{r1}$, $t_{r2}$, $t_{r3}$ and $t_{r4}$. It is also observed that specimens accumulating creep strain at higher strain rates, e.g. $\sigma_1$, fail at shorter times $t_{rn}$ but have a higher strain capability $\epsilon_{rn}$, wherein n is an integer. This indicates that not only the absolute amount of strain accumulation, but also the rate at which it accumulates, is important to a strain based damage criteria. A material property which employs these concepts is the average creep rate to rupture $\dot{\epsilon}_{avg}$ which is defined as:

$$\dot{\epsilon}_{avg}=\frac{\epsilon_r}{t_r} \qquad (2)$$

It is believed by applicant that these principles and observation may be beneficially directly applied to turbine components operating in the creep regime of the material constituting the component in order to obtain a more accurate indication of component life expended, or remaining useful life of the component, than is available using previous techniques.

Figure 3:
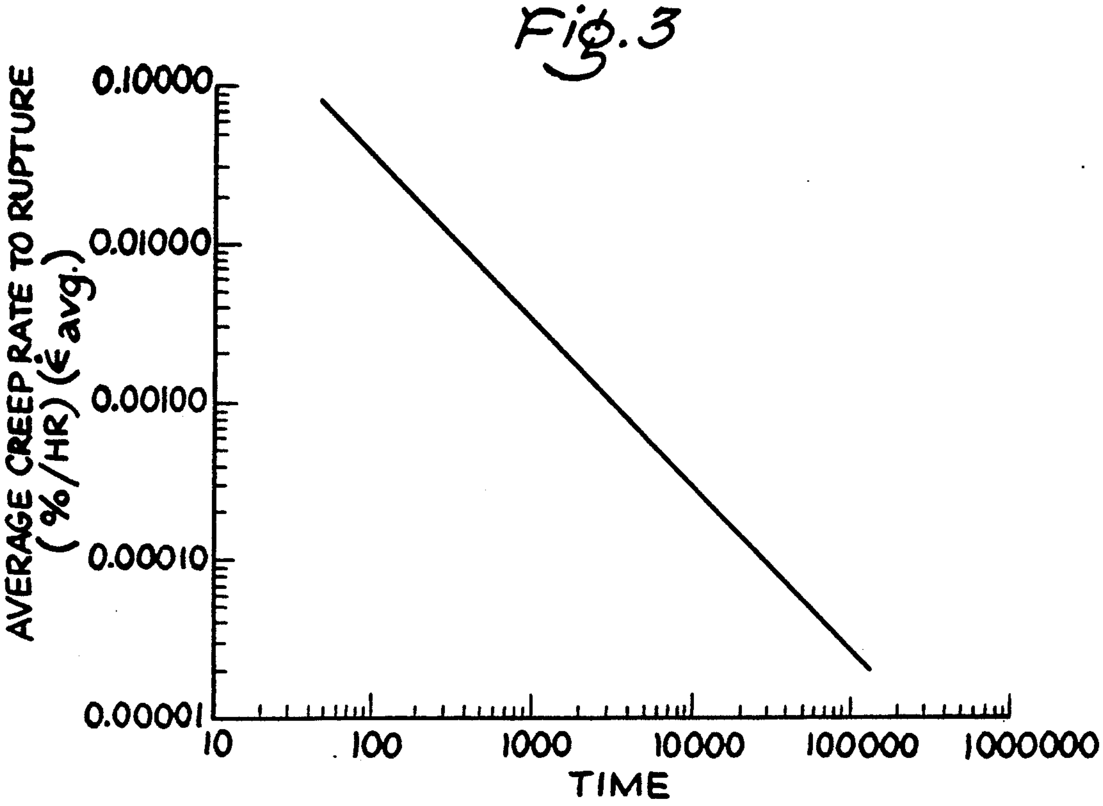
FIG. 3 is a graph of average creep rate to rupture versus time to rupture of a test specimen over a predetermined temperature range.

FIG. 3 illustrates a graph plotted on a log-log scale of average creep rate to rupture $\epsilon_{avg}$ versus time to rupture $t_r$ for a specimen comprising a typical material used in the high temperature region of turbines. The data for generating the graph were derived from rupture tests performed at different predetermined temperatures within the expected high temperature operating range of a turbine component, i.e. from about 900° F. to about 1100° F., and over a range of stress levels which caused failure to occur from relatively short times to very long times, i.e. about 90 hours to about 60,000 hours. Several important observations were made from the data used to generate the graph of FIG. 3. The scatter band for the data was relatively narrow (i.e. well within two standard deviations) over a large range of times to rupture, i.e. from about 90 hours to about 60,000 hours, and there was no apparent temperature dependence, at least not over the temperature range employed for testing. By eliminating temperature dependence from consideration, many analytical complications are avoided. The curve of FIG. 3 also demonstrates the phenomenon of ductility, (i.e. ability of an object to deform without fracturing) or strain capability, decreasing with time, and thus would be expected to be able to be extrapolated to relatively long service times, i.e. greater than 100,000 hours. Since the data indicate a linear relationship between log ($\epsilon_{avg}$) and log ($t_r$), a mathematical expression is readily derived. Time to rupture $t_r$ is related to average creep rate to rupture $\epsilon_{avg}$ by:

$$\log(t_r) = \log(P) + Q\log(\epsilon_{avg}), \text{ or} \quad (3a)$$

$$t_r = P\dot{\epsilon}_{avg}{}^{Q}, \quad (3b)$$

wherein P and Q are coefficients which define the curve of FIG. 3. Statistical scatter bands, for indicating the limits of expected data for a predetermined confidence level, may also be readily determined as required.

This correlation between time to rupture $t_r$ and average creep rate to rupture $\epsilon_{avg}$ can be used in conjunction with methods for calculating creep strain $\epsilon_n$ to determine expended life of turbine components in accordance with the present invention, wherein it is expected that turbine components operating in the creep regime of materials constituting the components behave analogously to the test specimens used to obtain data for generating the curve of FIG. 3.

Figure 4:
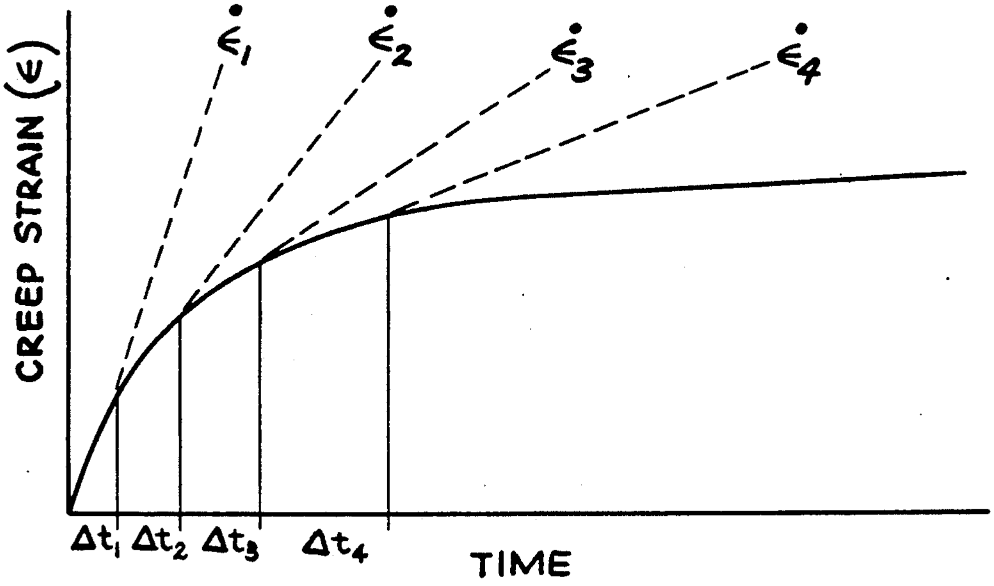
FIG. 4 is a graph of a calculated creep curve for a turbine component illustrating part of an iterative process in accordance with the present invention.

Referring to FIG. 4, a graph of calculated creep strain $\epsilon_n$ versus time, for a typical turbine component, using equation (1), is shown. Also shown are a representative plurality of intervals of time $\Delta t_1$, $\Delta t_2$, $\Delta t_3$ and $\Delta t_4$ having corresponding strain rates $\dot{\epsilon}_1$, $\dot{\epsilon}_2$, $\dot{\epsilon}_3$ and $\dot{\epsilon}_4$ associated therewith. For interval $\Delta t_1$, the time to rupture $t_{r1}$ can be determined by substituting $\dot{\epsilon}_1$ for $\dot{\epsilon}_{avg}$ in equation (3*a*) or (3*b*). Thus, time to rupture $t_{r1} = P\dot{\epsilon}_1{}^{Q}$. The fraction of rupture life consumed, or rupture damage $\Delta D_1$, during interval $\Delta t_1$ may be determined from:

$$\Delta D_n = \frac{\Delta t}{t_{rn}} \quad (4)$$

wherein, $D_n$ = strain rate damage for interval n, wherein n is an integer, $\Delta_t$ = operating time at a predetermined strain rate, and $t_{rn}$ = time to rupture for the predetermined strain rate of interval n.

For each of the remaining time intervals, the indicated strain rates $\epsilon_2$, $\epsilon_3$ and $\epsilon_4$ are different, which results in different times to rupture $t_{r2}$, $t_{r3}$ and $t_{r4}$ and different increments of damage $\Delta D_2$, $\Delta D_3$ and $\Delta D_4$. The total damage to, or life expended of, a component after operating through n intervals, wherein a new interval preferably is started (and the previous interval is ended) so that the strain rate $\epsilon_n$ at least piecewise linearly approximates the curve of FIG. 4, is the sum of the incremental damage $\Delta D_n$ for each interval. This may be represented by equation (5):

$$D_T = \sum_{1}^{n} \frac{\Delta t_1}{t_{r1}} + \frac{\Delta t_2}{t_{r2}} + \ldots \frac{\Delta t_n}{t_{rn}} \quad (5)$$

wherein, $D_T$ = total cumulative damage, and n = number of intervals.

Figure 7:
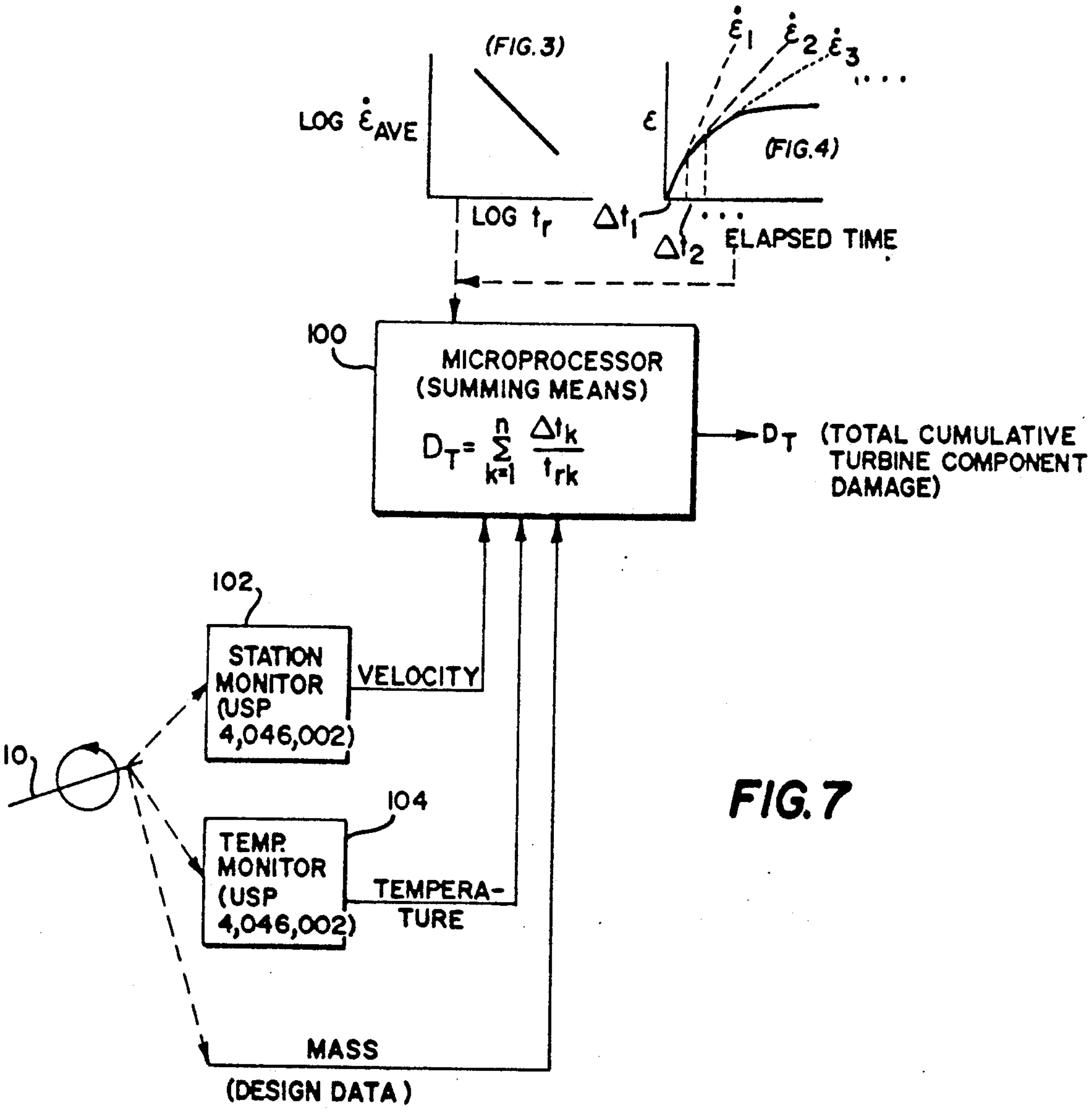
FIG. 7 is an exemplary system embodiment for measuring the cumulative turbine component damage and the remaining useful life of such components.

Total cumulative damage $D_T$, or component life expended, may be accumulated in a summing means, such as microprocessor 100. Time intervals $\Delta t_n$ may be made arbitrarily small within the computing limitations of the system. An exemplary embodiment of such a system is shown in FIG. 7.

Figure 5:
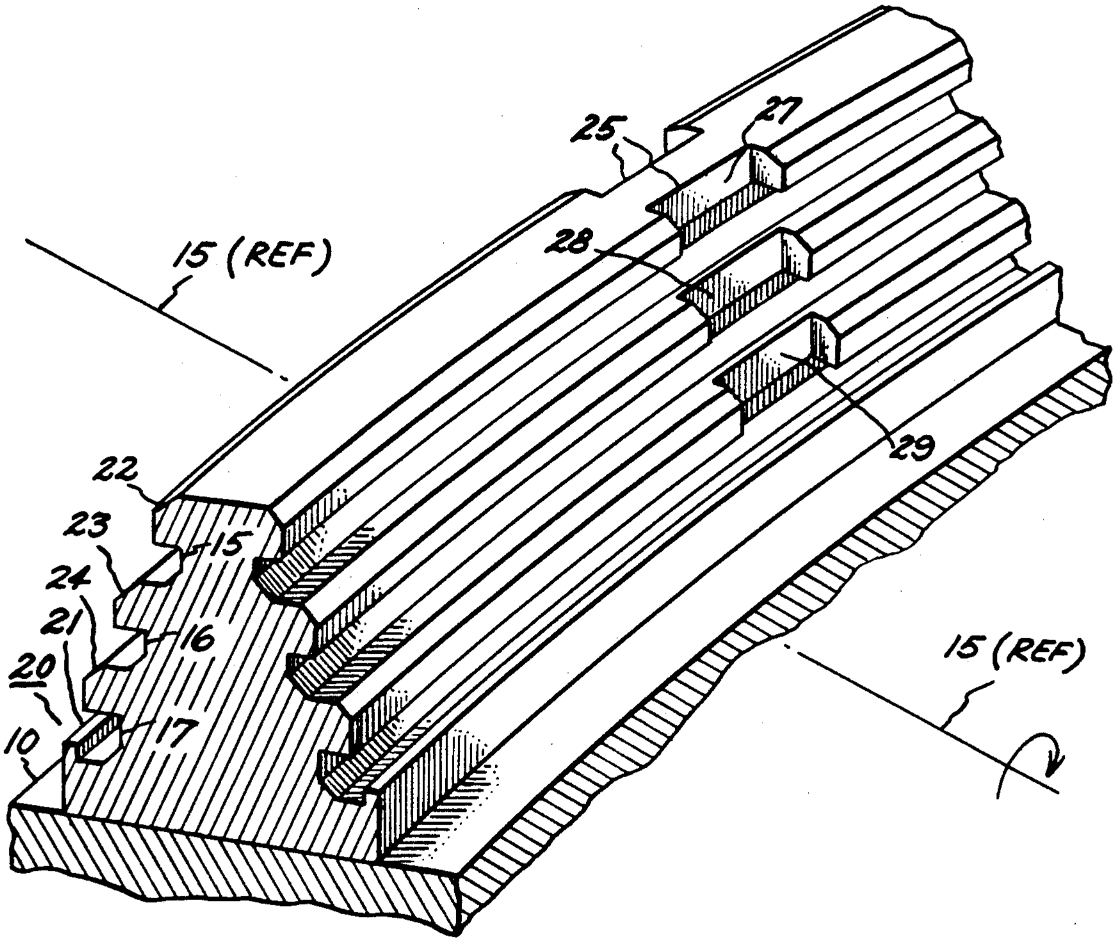
FIG. 5 is a perspective view of a portion of a typical turbine tangential entry wheel dovetail.

Referring to FIG. 5, a perspective view of a portion of a typical turbine tangential entry wheel dovetail 20 is shown. Dovetail 20 may be fixedly secured such as by an interference shrink fit and/or an appropriate key and keyway to a rotatable shaft 10, having an axis of rotation 15. Alternatively, dovetail 20 may be fabricated integral shaft 10. Dovetail 20 comprises a plurality of axially extending (with respect to shaft 10) ribs 22, 23 and 24 formed by undercuts 15, 16 and 17 in the axial sidewalls of dovetail 20. Registered portions of ribs 22, 23 and 24 are relieved over a predetermined circumferential distance to form a filling slot 25 for receiving bucket dovetails (not shown) having a complementary configuration for tightly engaging ribs 22, 23, 24 and cutouts 15, 16 and 17 and further having aerodynamic blades, or buckets, (not shown) affixed to the radial outer portion of corresponding bucket dovetails. The bucket dovetails and associated buckets are operationally circumferentially disposed around shaft 10. Such an arrangement having slightly different contoured dovetails is illustrated in U.S. Pat. No. 1,415,266—Rice, assigned to the present assignee.

The applied force and resulting stress on wheel dovetail 20 is primarily a function of the mass of the bucket dovetails and associated components (not shown) secured radially outward wheel dovetail 20, the speed of rotation of shaft 10 and operating temperature of wheel dovetail 20. The mass, temperature and speed of rotation (angular velocity) may be determined by any convenient means. For example as illustrated in FIG. 7, in a turbine used for driving an electrical generator, station monitoring equipment 102 may be used to provide angular velocity, temperature may be monitored by apparatus 104 disclosed in U.S. Pat. No. 4,046,002 and mass may be obtained from turbine design data. Although mass and angular velocity should enable proper selection of a curve from a family of curves such as shown in FIG. 2, and temperature will determine which family of curves to use, it may be possible to simplify the computations. Many turbines, such as utility turbines for driving electrical generators, operate at a substantially constant angular velocity, e.g. 3600 RPM (U.S.) or 3000 RPM (Europe), and a substantially constant input gas temperature. Besides, as previously shown in FIG. 3, there does not appear to be a temperature dependence in average creep rate to rupture vs time to rupture over a temperature range from about 900° F. to about 1100° F. Many steam turbines have an input temperature in this range. Thus, as a good approximation, it is only necessary to know the time that such a turbine has operated with a gas input temperature in the range of 900° F. to 1100° F. Temperature profile, or gradient, within the turbine may be determined by measurement as hereinbefore described, from design criteria or from operating experience, without undue experimentation.

Figure 6A:
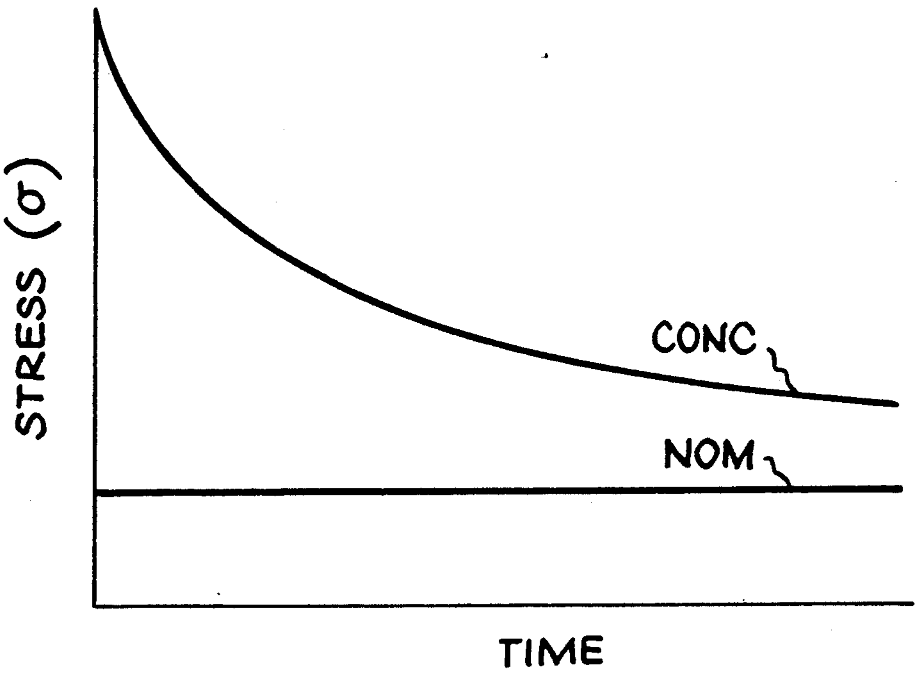
FIGS. 6A and 6B are graphs of nominal and concentrated stress and creep strain, respectively, for the typical turbine tangential entry wheel dovetail shown in FIG. 5, in accordance with the present invention.
Figure 6B:
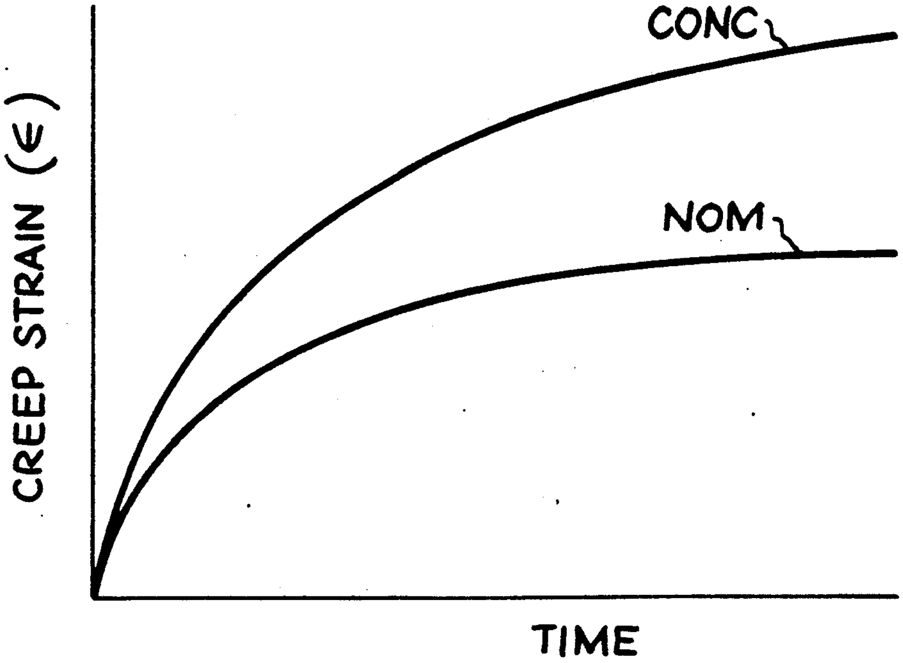

Referring to FIGS. 6A and 6B, graphs of nominal stress and creep strain, respectively, for dovetail 20 of FIG. 5 are shown. Nominal stress $\epsilon$(NOM) or creep strain $\epsilon$(NOM) is the average stress or creep strain over the widest portion, or base, 21 of dovetail 20. Concentrated stress $\sigma$(CONC) or creep strain $\epsilon$(CONC) is the highest stress or creep in dovetail 20, which typically occurs in the region of cutouts 15, 16, and 17. The relation between nominal and concentrated stress is primarily a function of the geometry of dovetail 20 and may be obtained from a combination of *Stress Concentration Factors*—R. E. Peterson, John Wiley & Sons, Inc. (1974) and Stowell's equation:

$$K_\sigma = 1 + (K_T - 1)\frac{S}{S_N}$$

wherein:

$K_\sigma$=inelastic stress concentration factor, $K_T$=elastic stress concentration factor, S=secant modulus for concentrated stress.

$S_n$=secant modulus for nominal stress.

$K_\sigma$ is also defined as the quotient of the concentrated stress divided by the nominal stress. The concentrated creep strain curve of FIG. 6B may be used analogously to the curve of FIG. 4.

Thus, in accordance with the present invention, a method for calculating creep rupture damage for a turbine component includes determining the rate of creep strain accumulation in the component whenever the component is stressed at a high temperature, i.e. greater than about 900° F., for a predetermined period of time. Strain rate damage D, may be determined from equation (6):

$$D_T = \sum_1^n \frac{\Delta t_n}{t_{rn}}, \qquad (6)$$

wherein $D_T$ is the accumulated strain rate damage to the component, $\Delta t_n$ is the operating time of the component at a predetermined creep strain rate $\epsilon_n$ and $t_{rn}$ is the time to rupture of a turbine component at the predetermined creep strain rate. Since accumulated strain rate damage $D_T$ represents the cumulative fractional life of the turbine component expended, failure of the component is predicted to occur when $D_T$ equals one, and therefore, the remaining useful life of the turbine component equals the total time (i.e. from beginning operation of the component) it takes $D_T$ to equal one minus the total actual service time of the component. For example, at any moment, the time at which $D_T$ will equal one may be determined by assuming previous operating conditions for the component will continue to be substantially the same in the future.

Equation (6) can be applied to any loading condition, or operating situation, for which the tensile creep strain behavior can be estimated or is ascertainable or definable. It is particularly useful for cases wherein the stress does not remain constant, since it is generally variation in operational stress over time which invalidates the method or generates unacceptable errors when using prior techniques for predicting component life expended or remaining useful component life. For example, where a concentrated stress, which is initially greater than a nominal stress, is present, the concentrated stress tends to relax, or decrease, due to the mechanism of creep, thus changing the stress without operating conditions necessarily changing.

Thus has been illustrated and described a method for accurately determining remaining useful life, or life expended, of turbine components, wherein the components are subjected to the effect of creep damage, while including the effects of creep rate accumulation.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for accumulating, in digital data processing circuits, a measure of cumulative component life damage $D_T$ incurred by a turbomachine component during use in an environment wherein creep of material in the component is a major factor in determining remaining useful life of the component, said component exhibiting predetermined but changing rates of creep strain $\xi_k$ as a function of corresponding successive elapsed time intervals $\Delta t_k$ at predetermined operating conditions after initiating each turbomachine cycle of operation, k being an integer 1,2, . . . n, said method comprising the steps of:

(a) for each of successive elapsed time intervals $\Delta t_k$ when said predetermined operating conditions prevail, generating in digital data processing circuits an incremental measure of component life damage $\Delta D_k$ equal to the ratio of the time interval $\Delta t_k$ to a time-to-rupture $t_{rk}$ for the rate of creep strain $\xi_k$ corresponding to time interval $\Delta t_k$; and (b) accumulating in said digital data processing circuits said incremental measures of component life damage $\Delta D_k$ to generate therein said cumulative component life damage $D_T$.

2. The method of claim 1 wherein said predetermined but changing rate of creep strain for a given component are based on the known mass of said component operating at a predetermined angular velocity and temperature.

3. The method of claim 2 further including the step of:

selecting said predetermined but changing rates of creep strain corresponding to a particular said turbomachine component for use in said digital data processing circuits.

4. The method of claim 1 further including the steps of:

determining from said cumulative component life damage the remaining useful life of the component; and removing said component from service when the determination indicates that substantially no useful life remains.

5. System apparatus for measuring cumulative component life damage to a turbomachine component employed in an environment wherein creep of material in the component is a major factor in determining the remaining useful life of the component, said component exhibiting predetermined but changing rates of creep strain, and hence correspondingly changing times-to-rupture, as a function of respectively corresponding successive elapsed time intervals at predetermined turbomachine component operating conditions, said apparatus comprising:

(a) means for detecting the occurrence of said predetermined operating conditions;

(b) means responsive to said detecting means for measuring said successive elapsed time intervals from each initial occurrence of said predetermined operating conditions so long as such operating conditions persist;

(c) means for generating an incremental measure of component life damage for each said elapsed time interval based on the predetermined rate of creep strain and time-to-rupture prevailing during such time interval; and (d) means for generating a measure of cumulative component life damage by accumulating said incremental measures of component life damage.

6. System apparatus as in claim 5 wherein said means for detecting includes:

(e) means for measuring the angular velocity of said turbomachine component; and (f) means for measuring the temperatures of said turbomachine component; and

7. System apparatus as recited in claim 5 wherein said predetermined rate of creep strain and time-to-rupture are dependent on the mass, angular velocity and temperature of said turbomachine component.

8. A method of measuring cumulative component life damage to a turbomachine component employed in an environment wherein creep of material in the component is a major factor in determining the remaining useful life of the component, said component exhibiting predetermined but changing rates of creep strain, and hence correspondingly changing times-to-rupture, as a function of respectively corresponding successive elapsed time intervals at predetermined turbomachine component operating conditions, said method comprising the steps of:

(a) detecting the occurrence of said predetermined operating conditions;

(b) measuring said successive elapsed time intervals from each initial occurrence of said predetermined operating conditions so long as such operating conditions persist;

(c) generating an incremental measure of component life damage for each said elapsed time interval based on the predetermined rate of creep strain and time-to-rupture prevailing during such time interval; and (d) generating a measure of cumulative component life damage by accumulating said incremental measures of component life damage.

9. A machine system for accumulating a measure of cumulative component life damage $D_T$ incurred by a turbomachine component during use in an environment wherein creep of material in the component is a major factor in determining remaining useful life of the component, said component exhibiting predetermined but changing rates of creep strain $\xi_k$ as a function of corresponding elapsed time intervals $\Delta t_k$ at predetermined operating conditions after initiating each turbomachine cycle of operation, k being an integer 1,2 . . . n, said system comprising in combination:

(a) circuit means for generating an incremental measure of component life damage $\Delta D_k$ for each of successive elapsed time intervals $\Delta t_k$ when said predetermined operating conditions prevail, said incremental measure being equal to the ratio of the time interval $\Delta t_k$ to a time-to-rupture $t_{rk}$ for the rate of creep strain $\xi_k$ corresponding to time interval $\Delta t_k$; and (b) circuit means for accumulating said incremental measures of component life damage $\Delta D_k$ to generate therein said cumulative component life damage $D_T$.

10. A method of measuring in situ the life expended for turbomachine component parts using digital data processing circuits to determine an indication of cumulative component part life damage incurred by cyclic use in an environment wherein creep of material in the component parts is a major factor in determining remaining useful life of the component parts, said parts exhibiting predetermined but changing rates of creep strain and correspondingly changing times-to-rupture, as a function of corresponding successive elapsed time intervals at predetermined temperature and velocity operating conditions, said method comprising the steps of:

detecting the occurrence of said predetermined temperature and angular velocity conditions;

measuring the successive elapsed time intervals upon the detection of each occurrence of said predetermined conditions;

generating an incremental measure of a particular component part life damage for each said elapsed time intervals based on the predetermined rate of creep strain and time-to-rupture for said particular part prevailing during such time interval;

generating a measure of cumulative component part life damage for said particular part by accumulating said incremental measures of component part life damage; and generating a measure of the estimated remaining useful life of said particular component part.

11. The measuring method of claim 10 further including the step of removing said particular component part from service when the estimated remaining useful life indicates that substantially no useful life remains.

* * * * *